J. A. HAWTHORNE, Sr.
WHEEL.
APPLICATION FILED MAR. 29, 1921.
1,431,795.
Patented Oct. 10, 1922.
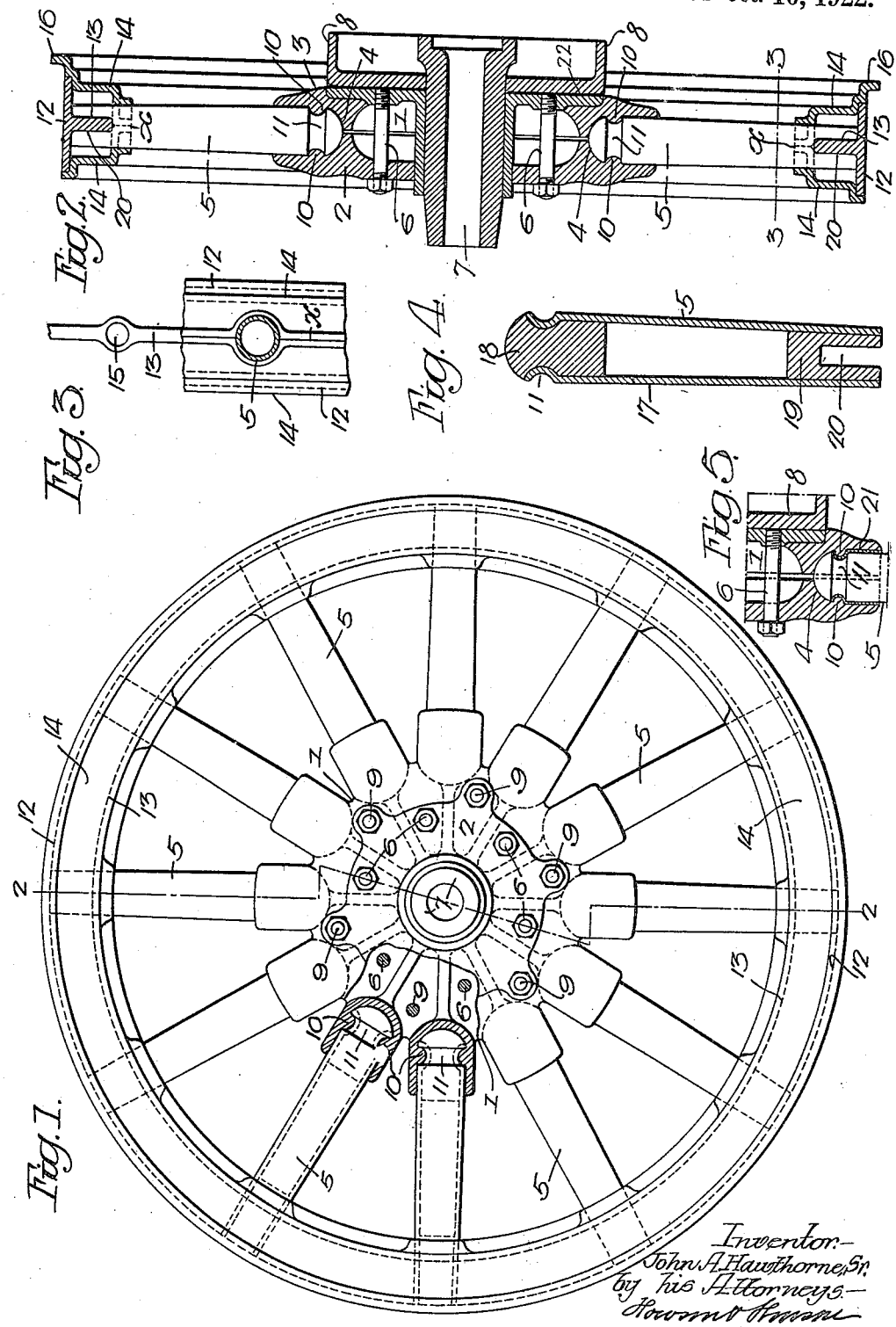

Patented Oct. 10, 1922.

1,431,795

UNITED STATES PATENT OFFICE.

JOHN A. HAWTHORNE, SR., OF PHILADELPHIA, PENNSYLVANIA.

WHEEL.

Application filed March 29, 1921. Serial No. 456,782.

*To all whom it may concern:*

Be it known that I, JOHN A. HAWTHORNE, Sr., a citizen of the United States, residing in Philadelphia, Pennsylvania, have invented certain Improvements in Wheels, of which the following is a specification.

My invention relates to certain improvements in vehicle wheels, especially wheels of automobiles and power driven trucks.

One object of my invention is to make a wheel entirely of metal having the general design of a wooden wheel.

A further object of the invention is to make a metallic wheel having separate spokes, held firmly to the hub sections and to the rim.

A still further object of the invention is to make the rim of three pieces, two of which are welded together when the parts are assembled.

These objects I attain in the following manner, reference being had to the accompanying drawings, in which:

Fig. 1 is a side view of my improved wheel, showing a part of the wheel in section;

Fig. 2 is a sectional view on the line 2—2, Fig. 1;

Fig. 3 is a sectional view on the line 3—3, Fig. 2;

Fig. 4 is a detached sectional view of one of the spokes; and

Fig. 5 is a view showing a liner between the spokes and the hub sections.

Referring to the drawings, 1 is the hub of the wheel made in two sections 2 and 3. These sections are recessed at 4 for the reception of the spokes 5 and are secured together and to the spokes by bolts 6. 7 is a hub section, which is mounted on the axle and is adapted to the hub 1 of the wheel. 8 is a brake drum, in the present instance, which is held to one side of the wheel hub by bolts 9. A liner 22, of any suitable material, is placed between the hub and the drum, as shown in Fig. 2. In the recesses 4 of the hub section are ribs 10, which extend into grooves 11 in the spokes 5 so that when the two sections are clamped onto the spokes, the spokes are held firmly in place.

12 is the rim of the wheel made of a T-bar bent into shape and welded, the central flange 13 extending inwardly, as shown. Each spoke is notched at 20 to extend over the flange 13. Thus, the outer end of each spoke is held against lateral displacement. On each side of the rim are annular side members 14, which are shaped, as shown, so as to enclose the rim and to abut against each other beyond the internal flange 13 of the rim. These side members are shaped to encircle the spokes, as clearly shown in Fig. 3. When in position and they are welded on the line $x$, they provide additional means for holding the spokes against lateral displacement and also hold them against movement on the rim. The rim is preferably shaped as shown in Fig. 3, so as to provide an opening for the passage of the valve stem of an inner tube when an inflatable tire is used on the wheel.

When a demountable rim is used, a flange 16 is formed on one of the side members 14, which projects beyond the rim 12, and which acts to hold a rim in place with the usual clamp mechanism.

Each of the spokes is made from a tube 17, preferably slightly tapered and driven into one end of each spoke is a plug 18 and driven into the other end is a plug 19. These plugs are welded to the spokes and, after they are welded in position, a notch 20 is cut in each spoke and the groove 11 is formed, preferably during the welding operation.

A wheel made in accordance with my invention can be manufactured economically and, when assembled, the wheel will be substantial and will resist the strains to which an automobile, or heavy truck, wheel is subjected.

In some instances, I may use a liner strip of copper, or fabric, between each spoke and the hub sections, as at 21, Fig. 5. These liner strips will allow the parts to be firmly clamped together.

I claim:

1. The combination in a vehicle wheel, of a rim, a two-part hub, each part having a series of half sockets, each half socket having an internal rib; a series of spokes located in the sockets of the hub section and engaging the rim, each spoke having an annular groove into which the ribs of the socket extend; and means for securing the hub sections together and to the spokes.

2. The combination in a wheel, of a hub; a series of spokes secured at one end to the hub; a rim with which the opposite ends of the spokes engage; and an annular side member on each side of the rim and shaped to conform to the spokes, said side members being secured together.

3. The combination in a vehicle wheel, of a hub, a rim, T-shaped in cross section; a series of spokes secured at one end to the hub and notched on the opposite end to extend over the T-flange of the rim; and an annular side member at each side of the rim shaped to conform to the shape of the spokes, said side members being secured together.

4. The combination in a vehicle wheel, of a hub; a rim, T-shaped in cross section; a series of spokes secured at one end to the hub and notched on the opposite end to extend over the T-flange of the rim; and an annular side member at each side of the rim shaped to conform to the shape of the spokes, said side members being secured together by welding between the spokes.

5. The combination in a vehicle wheel, of a two-part hub having sockets in its periphery; a rib in each socket; bolts securing the two parts together; a rim; a series of spokes, each spoke being made tubular and having a plug at the inner end, said inner end being also grooved, the said grooved inner end of each spoke being adapted to a socket in the hub and the opposite end being secured to the rim.

6. The combination in a vehicle wheel, of a hub; an annular rim T-shaped in cross section; a series of spokes, each spoke being made tubular and having a notched plug at its outer end, the inner end of each spoke being secured to the hub and the notched outer end passing over the T-flange of the rim; and an annular side member at each side of the rim conforming to the shape of the spokes, said side members being secured together.

7. The combination in a metallic vehicle wheel, of a two-part hub section having sockets in its periphery; a rim; a series of spokes extending into the sockets of the hub and held to the rim; a liner between each spoke and its socket in the hub; and means for clamping the parts of the hub onto the spokes.

JOHN A. HAWTHORNE, Sr.